(12) United States Patent (10) Patent No.: US 8,661,615 B1
Li et al. (45) Date of Patent: Mar. 4, 2014

(54) PINTLE ASSEMBLY

(71) Applicant: Albion Industries Inc., Albion, MI (US)

(72) Inventors: Simon Li, Guangzhou (CN); Philip Guo, Guangzhou (CN)

(73) Assignee: Albion Industries Inc., Albion, MI (US)

( * ) Notice: Subject to any disclaimer, the term of this patent is extended or adjusted under 35 U.S.C. 154(b) by 0 days.

(21) Appl. No.: 13/769,365

(22) Filed: Feb. 17, 2013

(51) Int. Cl.
*B60B 33/00* (2006.01)

(52) U.S. Cl.
USPC .................................. 16/37; 16/18 R

(58) Field of Classification Search
USPC .................. 16/37, 38, 18 R, 31 R, 31 A, 386
See application file for complete search history.

(56) References Cited

U.S. PATENT DOCUMENTS

| | | | | |
|---|---|---|---|---|
| 1,439,149 A * | 12/1922 | Crandall | ............................ | 16/39 |
| 1,458,812 A * | 6/1923 | Fay | ................................... | 16/38 |
| 1,465,044 A * | 8/1923 | Johnson | ......................... | 16/18 R |
| 2,169,882 A * | 8/1939 | Noelting et al. | .................... | 16/38 |
| 2,521,948 A * | 9/1950 | Rice et al. | ........................ | 16/21 |
| 2,659,100 A * | 11/1953 | Cramer | .............................. | 16/22 |
| 2,885,718 A * | 5/1959 | Huff | .................................. | 16/39 |
| 2,992,449 A * | 7/1961 | Haydock | ........................... | 16/43 |
| 3,015,124 A * | 1/1962 | Haydock | ........................... | 16/43 |
| 3,018,506 A * | 1/1962 | Haydock | ........................... | 16/20 |
| 3,755,852 A * | 9/1973 | Greene | ............................. | 16/37 |
| 5,052,075 A * | 10/1991 | Harris | ............................... | 16/38 |
| 6,115,882 A * | 9/2000 | Miles et al. | ....................... | 16/37 |
| 7,128,494 B2 * | 10/2006 | Lucht | ......................... | 403/408.1 |

* cited by examiner

*Primary Examiner* — William Miller
(74) *Attorney, Agent, or Firm* — Mark J. Nahnsen; Barnes & Thornburg LLP

(57) ABSTRACT

A pintle assembly for use in conjunction with a caster wheel assembly. The pintle assembly includes an inner tube and sleeve that is overmolded to and round the inner tube. The inner tube may include grooves to aid in securing sleeve. The sleeve includes a tapered annular channel near the top portion of the pintle, such that a slide ring may be inserted into the tapered annular channel to secure the pintle assembly into a mounting tube through frictional engagement of the slip ring with both the over-molded sleeve and the mounting tube.

11 Claims, 5 Drawing Sheets

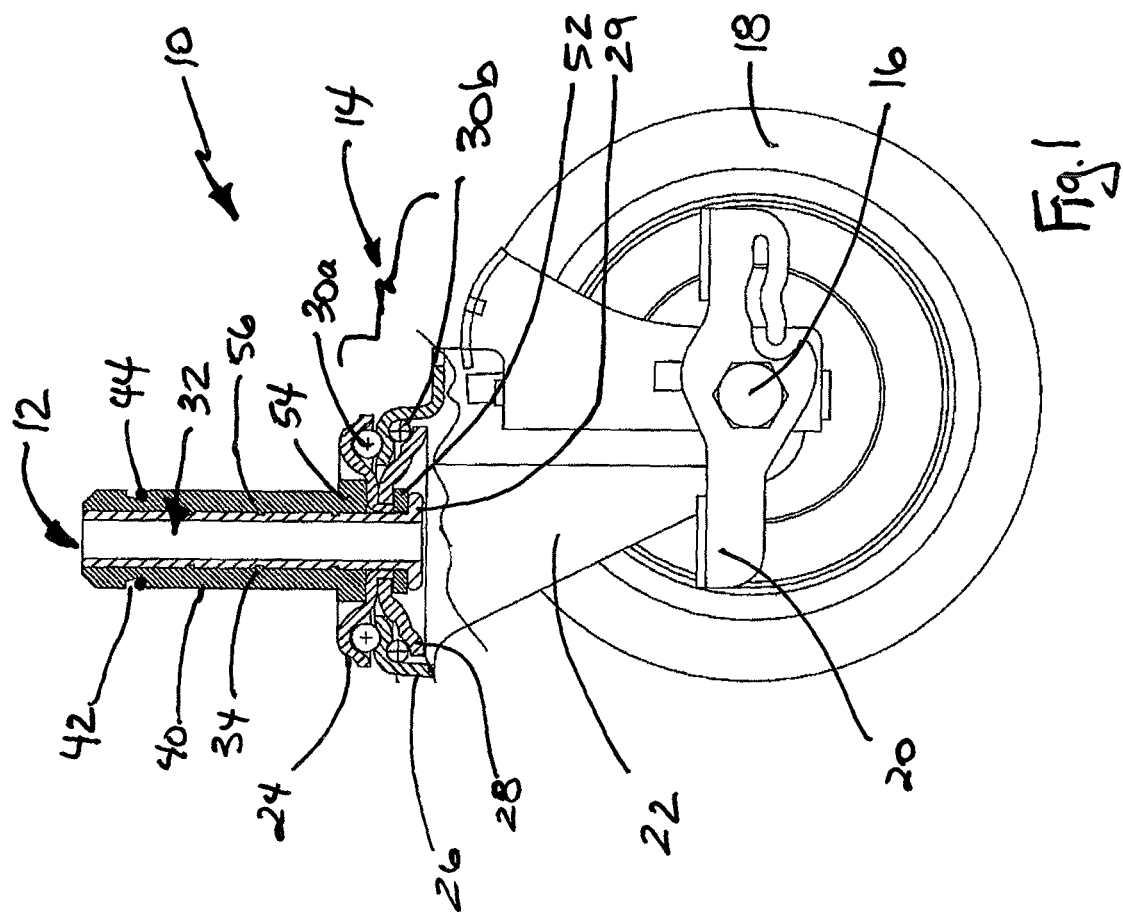

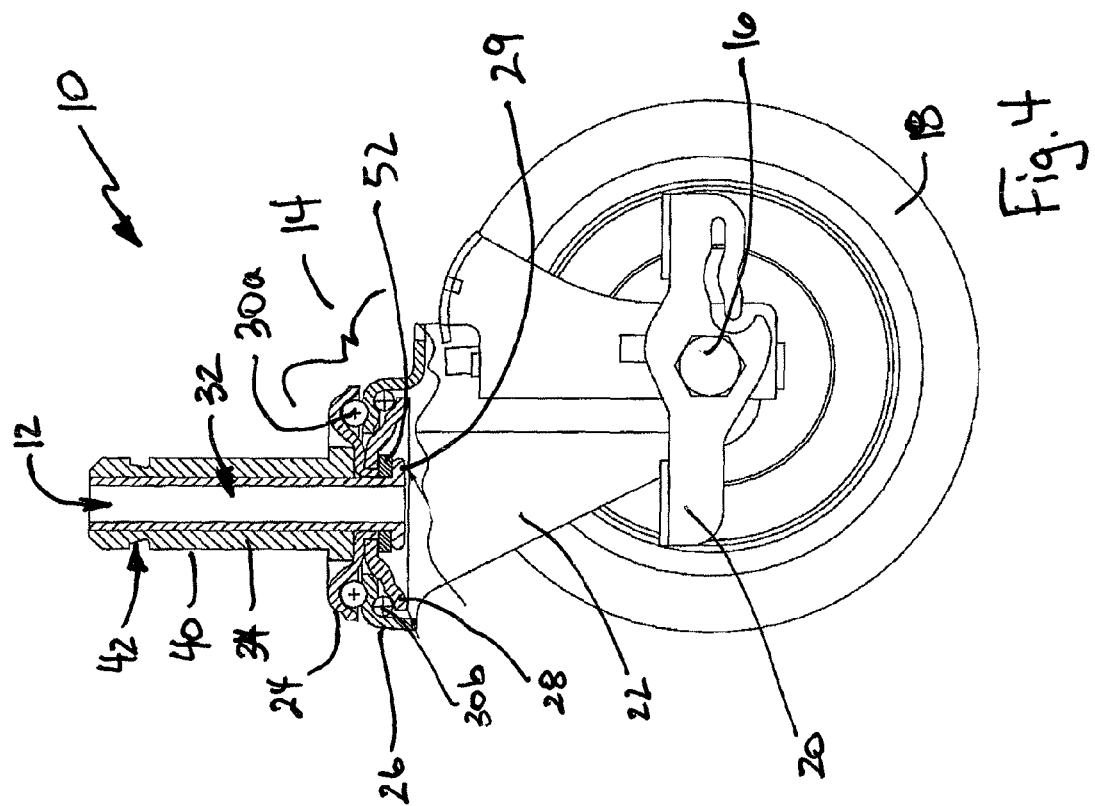

PINTLE ASSEMBLY

FIELD OF THE INVENTION

The present disclosure relates to pintles, and particularly to pintles that are used in conjunction with caster wheel assemblies.

SUMMARY

Pintles are on casters to form caster wheel assemblies. Pintles allow the casters to be secured to furniture such as office chairs. Pintles are typically designed to allow the caster wheels to rotate about an axis 360 degrees to permit the chair or other piece of furniture the ability to roll in any direction.

In the illustrative embodiment, the pintle includes an inner tube having a riveting end adapted to be coupled to a raceway of a caster bearing. The pintle also includes an overmolded sleeve that includes an annular flange at a first end and a tapered annular channel proximate a second end. Annular channel is configured to accept a slip ring to permit the pintle to be secured within a mounting tube of the furniture leg.

BRIEF DESCRIPTION OF THE DRAWINGS

The present invention and the advantages thereof will become more apparent upon consideration of the following detailed description when taken in conjunction with the accompanying drawings of which:

FIG. 1 is a side view of a caster assembly of the present invention, including a cross-sectional view of a pintle and bearing of the caster assembly and showing that the inner tube includes a series of external grooves configured to accept the overmolded polymer sleeve;

FIG. 4 is a cross-sectional side view of an alternative embodiment of the caster assembly of FIG. 1 showing that the inner tube includes a smooth exterior surface configured to accept the overmolded sleeve;

DETAILED DESCRIPTION

Figure 3:
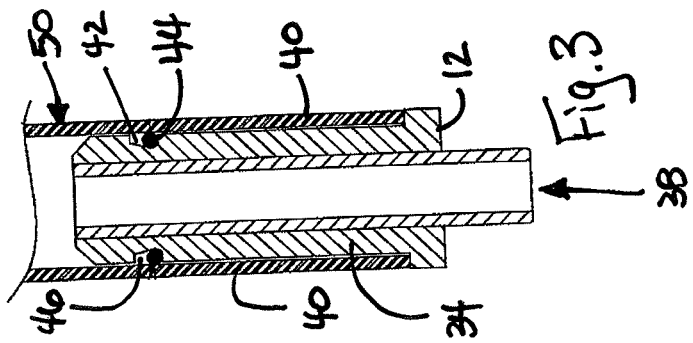
FIG. 3 is a cross-sectional view of the pintle of FIG. 2 as it mounts inside of a mounting tube of a piece of furniture.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

Referring now to the drawings, a caster assembly 10 as shown, for example, in FIG. 1, which includes a pintle assembly 12 connected to a fork assembly 14. The fork assembly 14 is generally of known construction and includes a pair of forks 22 an axle bolt 16 to connect to a caster wheel 18. The fork assembly 14 may also includes a brake assembly 20 that may be of any generally known construction to halt or impede the motion of the caster wheel 18.

In a preferred embodiment, fork assembly 14 includes a pair of forks 22 that connect to the axle bolt 16 at one end and to a bearing assembly 17 at a second end. Forks 22 of fork assembly 14 allow caster wheel 18 to pivot about bearing 17. At the uppermost portion, fork assembly 14 is coupled to bearing 17. Bearing 17 includes an upper raceway 24, an intermediate raceway 26 and a lower raceway 28. Multiple bearings 30a ride between the upper raceway 24 and the intermediate raceway 26 to provide circumferential movement of the upper raceway 24 in relation to the intermediate raceway 26.

Similarly, multiple bearings 30b ride between intermediate raceway 26 and lower raceway 28 to provide rotational movement of the intermediate raceway 26 in relation to the lower raceway 28. In a preferred embodiment, intermediate raceway 26 is coupled with fork assembly 14. It should be noted that various types of bearings are known in the art and the description of the preferred embodiment is not intended to limit the disclosure to only the disclosed bearing.

Figure 2:
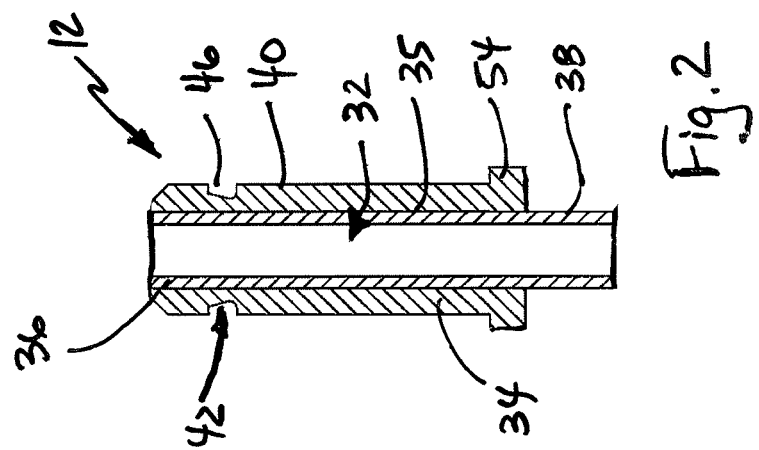
FIG. 2 is a cross-sectional view of an embodiment of the pintle.

Pintle assembly 12 includes an inner tube 32, as shown, for example, in FIGS. 2 and 3. Inner tube 32 of pintle assembly 12 is preferably hollow in structure and made of metal such as low carbon steel. Inner tube 32 includes an upper end 36 and a lower end 38 that is opposite of the upper end 36. Lower end is deformable to allow pintle assembly 12 to be secured to lower raceway 28. Lower end 28 of inner tube 32 is secured to lower raceway 28 by use of a press or other device that forms an outwardly extending flange 29, as shown, for example, in FIG. 1.

Pintle 12 also includes a sleeve 34 which is overmolded onto inner tube 32. Sleeve 34 is preferably formed from plastic or a plastic composite. Sleeve 34 circumferentially surrounds the exterior surface 35 of inner tube 32. In one embodiment inner tube 34 includes a series of annular grooves 56 to help secure sleeve 34. As seen in FIGS. 2 and 4, the over-molded sleeve 34 extends from upper end 36 of the inner tube 32 and stops short of lower end 38. Sleeve 34 includes an annular flange 54, which is at a pre-determined point above lower end 38 of inner tube 32. By over molding the sleeve 34 to the inner tube 32 to form flange 54 at pre-determined point above the lower end 38, the lower end 38 may be flared to form flange 29 to secure pintle assembly 12 to bearing 17. A preferred embodiment of the flange 29 can be seen in FIG. 4.

Sleeve 34 includes an annular outer surface 40 that is the outer boundary of the over-molded sleeve 34. Outer surface 40 includes a tapered annular groove 42 that is closer to the upper end 36 of inner tube 32 that over-molded sleeve 34 surrounds. The tapered annual groove 42 extends around annular wall 40 towards inner tube 32 but does not extend entirely through the over-molded sleeve 34 to the inner tube 32. More specifically, the tapered annular channel includes a tapered interior wall 46 that tapers inward toward the inner tube 32 as the tapered interior wall 46 extends toward the lower end 38 of the inner tube 32. Thus, the annular groove 42 is deepest, and its interior wall 46 is the closest to the inner tube 32, on the end of the annular groove 42 that is closest to the lower end 38. Tapered annular channel 42 is located at a pre-determined distance from upper end 36.

As seen in FIG. 1, inner tube 32 also includes a series of equally spaced annular grooves 56 formed in the outer surface 35 of the inner tube 32. Grooves 56 extend circumferentially around the inner tube 32 in spaced apart relation along the length of the over-molded sleeve 34. Grooves 56 provide an area thr the over-molded sleeve 34 to extend into while the plastic is being molded onto the inner tube 32 to secure sleeve 34 to tube 32.

As seen in FIGS. 1 and 3, a slip ring 44 is provided to fit in the tapered annular groove 42. The slip ring 44 is made of metal or other biasing material that is substantially resistant to compression force. When the slip ring 44 is inserted into the annular groove 42, it abuts the tapered interior wall 46 and can slideably move in the tapered annular channel towards either the upper end 36 or lower end 38 of pintle assembly 12. As the slip ring 44 slideably moves toward the upper end 36, the tapered interior wall 46 pushes the slip ring 44 outwardly and exposes more of the slip ring 44 to be outside of the annular wall 40 of the sleeve 34.

The upper end 36 of pintle 12 is adapted to fit into a mounting tube 50. Mounting tube 50 can be of any commonly known design for use in attaching caster wheels to objects such as furniture or other items that there is desire to make moveable, where the mounting tube 50 is located at or near the base such objects.

In order to assemble the caster assembly 10, the pintle 12 is riveted or press fit to bearing assembly 17 to form flange 29. In a preferred assembly, the inner tube 32 is riveted to the lower raceway 28 and a spacer 52 is positioned between flange 29 and lower raceway 28, as seen in FIG. 4. Annular flange 54 of sleeve 34 and flange 29 of inner tube 32 couple lower 28, intermediate 26 and upper 24 raceways together and secures bearings 30a and 30b.

In a preferred embodiment, to assembly caster assembly 10, upper raceway 24 is positioned on lower end 38 of inner tube 32 and bearings 30a are put into raceway 24. Next intermediate raceway 26 is positioned over lower end 38 and bearings 30b are put into raceway 26. Next lower raceway 28 and spacer 52 are positioned on lower end 38 of inner tube 32, as seen in FIGS. 1 and 4. The upper raceway 24 is held in position by the annular 54 of the over-molded sleeve 34. Once bearing assembly 17 is in position, lower end 39 of inner tube is pressed to form flange 29. Over-molded sleeve 34 is molded to the inner tube 32 by injection molding. During molding, the injected plastic or other material fills the grooves 56 to secure sleeve 34 the inner tube 32.

Figure 5:
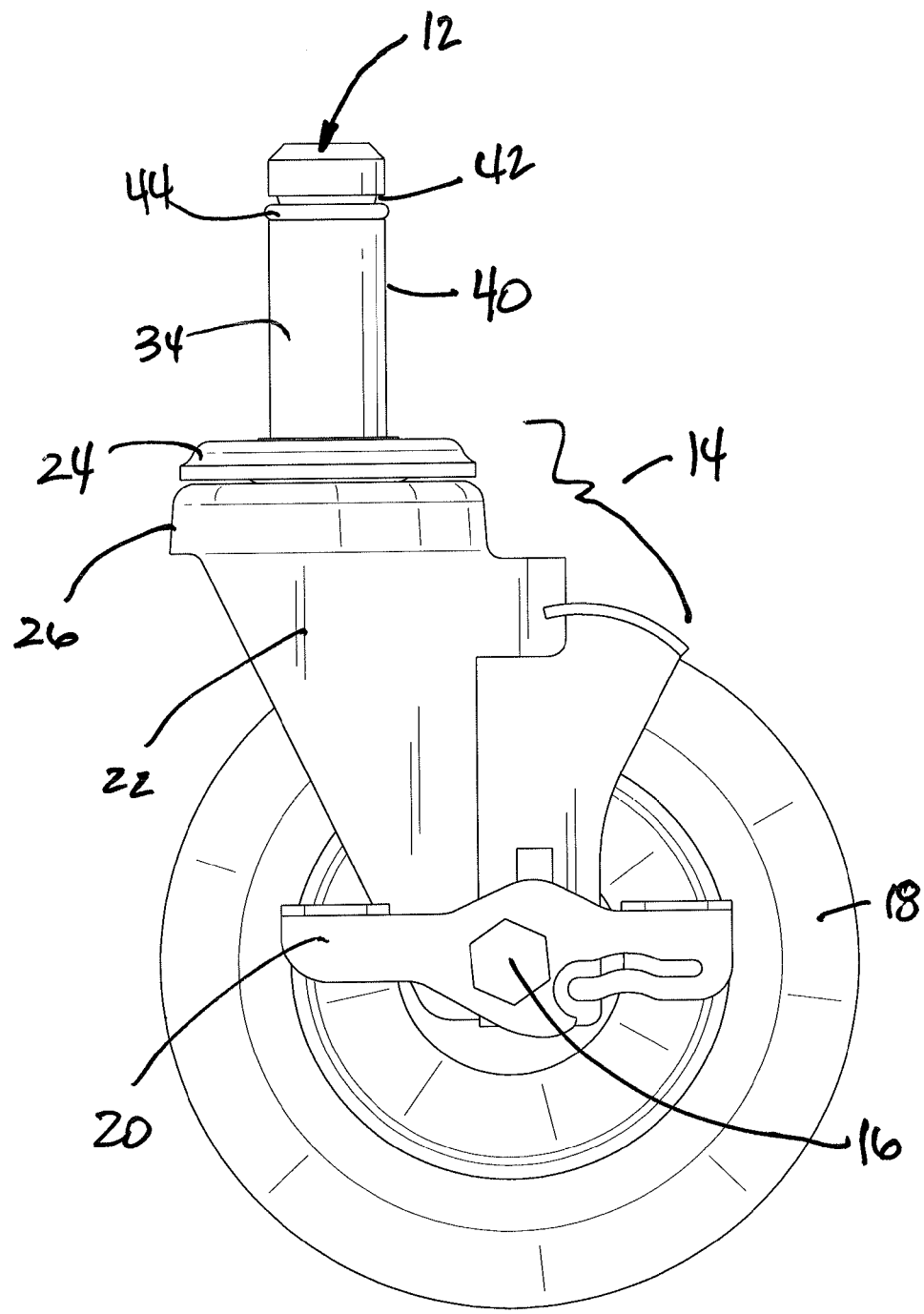
FIG. 5 is a side view of the caster assembly of FIG. 1.
Figure 6:
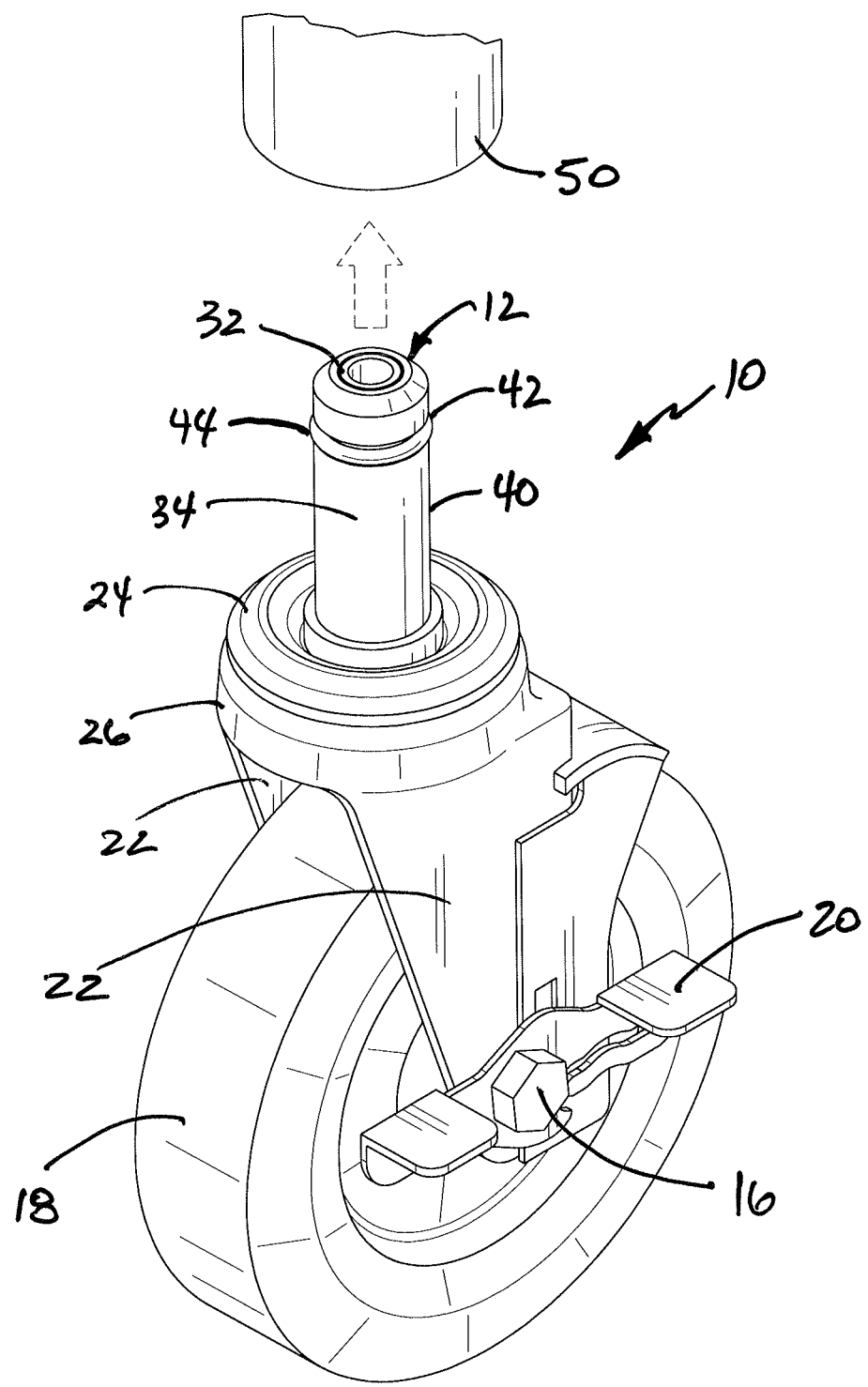
FIG. 6 is a perspective view of the caster assembly of FIG. 1 as it is being mounted into the mounting tube.

The slip ring 44 is inserted into the tapered annual channel 42 prior to insertion of the pintle 12 into the mounting tube 50, as seen in FIG. 5. As the pintle 12 is inserted into the mounting tube 50, which is generally depicted in FIG. 6, the slip ring 44 engages with the tapered interior wall 46. Once pintle assembly 12 is in position within mounting tube 50, slip ring 44 slides upward. As these multiple engagements occur, the frictional force causes the slip ring 44 to slide up the tapered interior wall 46 towards the upper end 36 of the groove 42. As slip ring 44 slides up the tapered interior wall 46, the slip ring 44 is pushed outwardly, exposing more of the slip ring 44 to be outside of the annular wall 40 of the pintle 12. In doing so, the slip ring 44 wedges against the mounting tube 50, holding the pintle 12 securely in the mounting tube 50.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as having or implying limitation of the disclosure to those embodiments.

There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The claimed invention is:

1. A caster assembly comprising:
   a bearing assembly having an upper race, a lower race and an intermediate race positioned between the upper and lower races;
   a series of bearings positioned between the races;
   a fork member coupled to the bearing assembly at an upper end, the fork member configured to be pivotally coupled to a wheel at a lower end; and
   a pintle assembly including an inner tube having an outer surface and a sleeve that is positioned over the outer surface of the inner tube, wherein the sleeve does not extend to the bottom end of the inner tube.

2. The caster assembly of claim 1, wherein the outer surface of the inner tube is formed to include a series of spaced apart annular grooves.

3. The caster assembly of claim 2, wherein the sleeve is made from a material that is overmolded onto the inner tube such that the material is molded into the annular grooves of the inner tube.

4. The caster assembly of claim 1, wherein the sleeve includes an upper end and a lower end, wherein the upper end includes an annular groove that is configured to accept a slip ring.

5. The caster assembly of claim 4, wherein the annular groove includes a tapered inner wall that decreases in diameter as it extends to the lower end of the sleeve.

6. The caster assembly of claim 1, wherein in the sleeve includes an outwardly extending annular flange.

7. The caster assembly of claim 1, wherein the bottom end of the inner tube is formed to include a flange to secure the pintle assembly to the bearing assembly.

8. The caster assembly of claim 7, wherein the inner tube is made from metal and the outer tube is made from plastic.

9. A pintle assembly for a caster comprising:
   an inner metal tube having an upper end and a lower end, the inner metal tube having an outer surface;
   an outer sleeve formed of a plastic material that is positioned over the outer surface of the inner metal tube, the outer sleeve including an upper end and a lower end;
   the outer sleeve having an outer surface formed to include an annular groove configured to accept a slip ring;
   wherein the lower end of the outer sleeve does not extend to a bottom edge of the inner tube and is formed to include an outwardly extending annular flange; and
   wherein the lower end of the inner metal tube forms a flange that is spaced apart from the annular flange of the outer sleeve when installed on a caster assembly.

10. The pintle assembly of claim 9 wherein the inner metal tube is formed to include a series of spaced apart annular grooves and wherein the outer sleeve is overmolded onto the inner metal tube such that the plastic material fills the annular grooves to secure the outer sleeve to the inner metal tube.

11. The pintle assembly of claim 9, wherein the outer groove of the inner metal tube includes a tapered bottom wall.

* * * * *